United States Patent
Nam

(10) Patent No.: US 12,373,038 B2
(45) Date of Patent: Jul. 29, 2025

(54) ELECTRONIC DEVICE FOR RECOGNIZING GESTURE AND METHOD FOR OPERATING THE SAME

(71) Applicant: Samsung Electronics Co., Ltd., Suwon-si (KR)

(72) Inventor: Jihwan Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/522,735

(22) Filed: Nov. 29, 2023

(65) Prior Publication Data

US 2024/0176424 A1 May 30, 2024

Related U.S. Application Data

(63) Continuation of application No. PCT/KR2023/019406, filed on Nov. 29, 2023.

(30) Foreign Application Priority Data

Nov. 29, 2022 (KR) ........................ 10-2022-0163397
Dec. 26, 2022 (KR) ........................ 10-2022-0184939

(51) Int. Cl.
  *G06F 3/01* (2006.01)
  *G06V 40/20* (2022.01)
  *H04N 7/14* (2006.01)

(52) U.S. Cl.
  CPC .............. *G06F 3/017* (2013.01); *G06V 40/20* (2022.01); *H04N 7/141* (2013.01)

(58) Field of Classification Search
  CPC ........ G06F 3/017; G06V 40/20; H04N 7/141; H04N 7/147
  See application file for complete search history.

(56) References Cited

U.S. PATENT DOCUMENTS

2005/0233766 A1  10/2005  Futami
2009/0291706 A1  11/2009  Lee et al.
(Continued)

FOREIGN PATENT DOCUMENTS

CN    110620840 A  * 12/2019
JP    2013-235588 A   11/2013
(Continued)

OTHER PUBLICATIONS

International Search Report dated Mar. 5, 2024, issued in International Patent Application No. PCT/KR2023/019406.

*Primary Examiner* — Stacy Khoo
(74) *Attorney, Agent, or Firm* — Jefferson IP Law, LLP

(57) ABSTRACT

An electronic device is provided. The electronic device includes memory storing instructions, a camera module, a communication module, a display module, and at least one processor operatively connected to the memory, the camera module, the communication module, and the display module. The instructions, that when executed by the at least one processor, cause the electronic device to identify a reception event of a video call based on the communication module, hook one or more images captured based on the camera module to provide image information corresponding to the hooked one or more images to a first application, identify a gesture based on information output from the first application, by inputting the image information to the first application, and perform at least one operation corresponding to the identified gesture.

20 Claims, 15 Drawing Sheets

(56) References Cited

U.S. PATENT DOCUMENTS

| | | |
|---|---|---|
| 2010/0259493 A1 | 10/2010 | Chang et al. |
| 2011/0102333 A1 | 5/2011 | Westerman |
| 2013/0122957 A1 | 5/2013 | Lee |
| 2013/0190093 A1* | 7/2013 | Wohlstadter ............ G06F 3/017 |
| | | 715/765 |
| 2013/0271360 A1 | 10/2013 | Macdougall et al. |
| 2013/0293454 A1 | 11/2013 | Jeon et al. |
| 2017/0119307 A1 | 5/2017 | Shim et al. |
| 2017/0237986 A1 | 8/2017 | Choi et al. |
| 2017/0351335 A1 | 12/2017 | Kim et al. |
| 2019/0037173 A1 | 1/2019 | Lee et al. |
| 2022/0261119 A1* | 8/2022 | Han ....................... H04N 7/147 |

FOREIGN PATENT DOCUMENTS

| | | |
|---|---|---|
| KR | 10-0833106 B1 | 5/2008 |
| KR | 10-2009-0121914 A | 11/2009 |
| KR | 10-2010-0108116 A | 10/2010 |
| KR | 10-2011-0028809 A | 3/2011 |
| KR | 10-2011-0040199 A | 4/2011 |
| KR | 10-1146553 B1 | 5/2012 |
| KR | 10-2014-0137649 A | 12/2014 |
| KR | 10-2015-0063739 A | 6/2015 |
| KR | 10-2016-0086684 A | 7/2016 |
| KR | 10-2017-0049280 A | 5/2017 |
| KR | 10-2017-0091913 A | 8/2017 |
| KR | 10-2017-0094745 A | 8/2017 |
| KR | 10-1848282 B1 | 5/2018 |
| KR | 10-2021-0033394 A | 3/2021 |
| KR | 102287891 B1 * | 4/2021 |
| KR | 10-2022-0017340 A | 2/2022 |
| KR | 10-2022-0078893 A | 6/2022 |
| WO | 2021-086688 A2 | 5/2021 |

\* cited by examiner

ELECTRONIC DEVICE FOR RECOGNIZING GESTURE AND METHOD FOR OPERATING THE SAME

CROSS-REFERENCE TO RELATED APPLICATION(S)

This application is a continuation application, claiming priority under § 365(c), of an International application No. PCT/KR2023/019406, filed on Nov. 29, 2023, which is based on and claims the benefit of a Korean patent application number 10-2022-0163397, filed on Nov. 29, 2022, in the Korean Intellectual Property Office, and of a Korean patent application number 10-2022-0184939, filed on Dec. 26, 2022, in the Korean Intellectual Property Office, the disclosure of each of which is incorporated by reference herein in its entirety.

TECHNICAL FIELD

The disclosure relates to an electronic device for recognizing a gesture and a method for operating the same.

BACKGROUND ART

There have been developed electronic devices having various functions as well as voice call functionality. This leads to advent of electronic devices equipped with video call functionality based on transmission/reception of video data as well as voice data, such as camera phones.

Electronic devices have been developed to be capable of receiving various inputs through the user's finger. In particular, touch screen entry is adopted for a wide range of electronic devices including smartphones, tablet personal computers (PCs), or laptop computers. The electronic device may recognize the user's gesture away from the user. The electronic device may determine the type of the recognized gesture and perform various functions according to the determined type of gesture.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide an electronic device for recognizing a gesture and a method for operating the same.

Additional aspects will be set forth in part in the description which follows and, in part, will be apparent from the description, or may be learned by practice of the presented embodiments.

In accordance with an aspect of the disclosure, an electronic device is provided. The electronic device includes memory storing instructions, a camera module, a communication module, a display module, and at least one processor operatively connected to the memory, the camera module, the communication module, and the display module. The instructions, that when executed by the at least one processor, cause the electronic device to identify a reception event of a video call based on the communication module, hook one or more images captured based on the camera module to provide image information corresponding to the hooked one or more images to a first application, identify a gesture based on information output from the first application, by inputting the image information to the first application, and perform at least one operation corresponding to the identified gesture.

In accordance with another aspect of the disclosure, a method for operating an electronic device is provided. The method includes identifying a reception event of a video call based on a communication module of the electronic device, hooking one or more images captured based on a camera module of the electronic device to provide image information corresponding to the hooked one or more images to a first application, identifying a gesture based on information output from the first application, by inputting the image information to the first application, and performing at least one operation corresponding to the identified gesture.

In accordance with another aspect of the disclosure, in a storage medium storing at least one computer-readable instruction, the at least one instruction, when executed by at least one processor of an electronic device, enables the electronic device to perform at least one operation. The at least one operation includes identifying a reception event of a video call based on a communication module of the electronic device, hooking one or more images captured based on a camera module of the electronic device to provide image information corresponding to the hooked one or more images to a first application, identifying a gesture based on information output from the first application, by inputting the image information to the first application, and performing at least one operation corresponding to the identified gesture.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
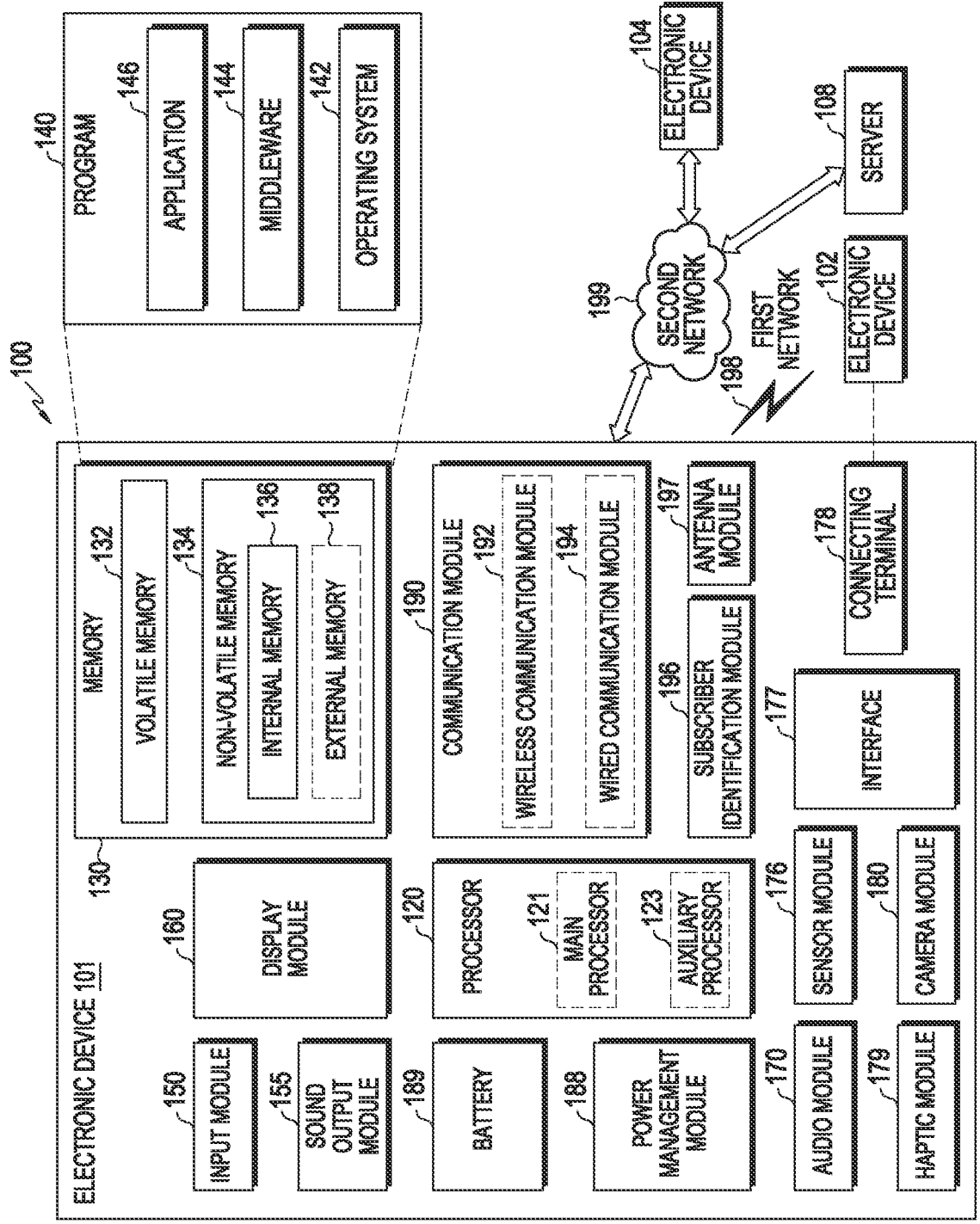
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal According to an embodiment of the disclosure, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for AI model processing. The AI model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The AI model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth-generation (5G) network, a next-generation communication network, the Internet, or a computer network (e.g., a local area network (LAN) or a wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductive body or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to an embodiment of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or health-care) based on 5G communication technology or IoT-related technology.

Figure 2:
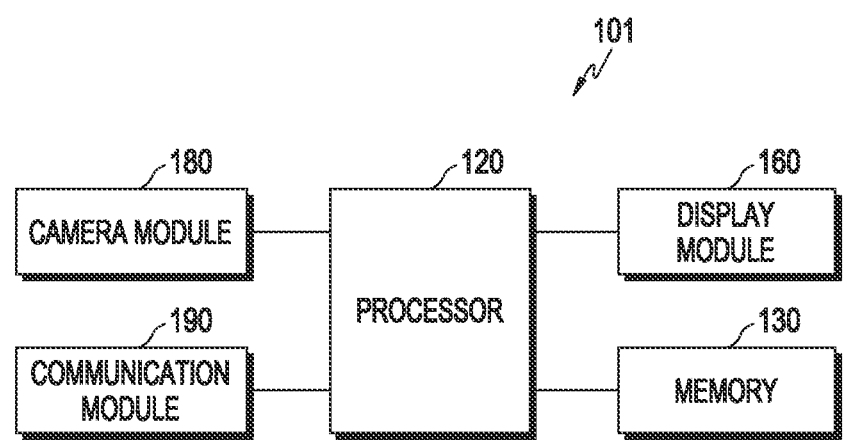
FIG. 2 is a block diagram illustrating an electronic device according to an embodiment of the disclosure.

FIG. 2 is a block diagram illustrating an electronic device according to an embodiment of the disclosure.

Referring to FIG. 2, in an embodiment of the disclosure, an electronic device 101 (e.g., the electronic device 101 of FIG. 1) may include a camera module 180, a communication module 190, a display module 160, a memory 130, and a processor 120. In an embodiment of the disclosure, the camera module 180 may be included in the camera module 180 of FIG. 1. In an embodiment of the disclosure, the communication module 190 may be included in the communication module 190 of FIG. 1. In an embodiment of the disclosure, the display module 160 may include the display module 160 of FIG. 1. According to an embodiment of the disclosure, the memory 130 may be included in the memory 130 of FIG. 1. According to an embodiment of the disclosure, the processor 120 may be included in the processor 120 of FIG. 1.

In an embodiment of the disclosure, the processor 120 may identify a reception event of a video call based on the communication module 190. The communication module 190 may receive a request for a voice call and/or a video call from an external electronic device (e.g., the external electronic device 104 of FIG. 1) through a network (e.g., the second network 199 of FIG. 1).

In an embodiment of the disclosure, the processor 120 may execute the camera module 180 based on identifying the reception event of the video call. The camera module 180 may capture one or more images based on at least one lens disposed toward the user. The processor 120 may hook the one or more images captured by the camera module 180. The processor 120 may provide image information corresponding to the hooked one or more hooked images to an application for gesture recognition. The operation of hooking images by the processor 120 is described below with reference to FIGS. 6 and 7. The processor 120 may identify a gesture based on the application for gesture recognition, and accordingly, the processor 120 may not always recognize the gesture. The processor 120 may perform at least one operation corresponding to the identified gesture. For example, the processor 120 may display information for at least one operation corresponding to the identified gesture on the display module 160.

In an embodiment of the disclosure, the memory 130 may store at least one algorithm (or model or instruction) required in the gesture recognition process. The memory 130 may temporarily store the intermediate results of execution of a plurality of algorithms (or models or instructions). The memory 130 may store at least one application and a gesture application for gesture recognition. At least one application may be configured to provide one or more hooked images and perform at least one operation corresponding to the identified gesture.

Although FIG. 2 illustrates that the electronic device 101 includes the camera module 180, the communication module 190, the display module 160, the memory 130, and/or the processor 120, the disclosure is not limited thereto. For example, the electronic device 101 may further include at least one component shown in FIG. 1.

Figure 3:
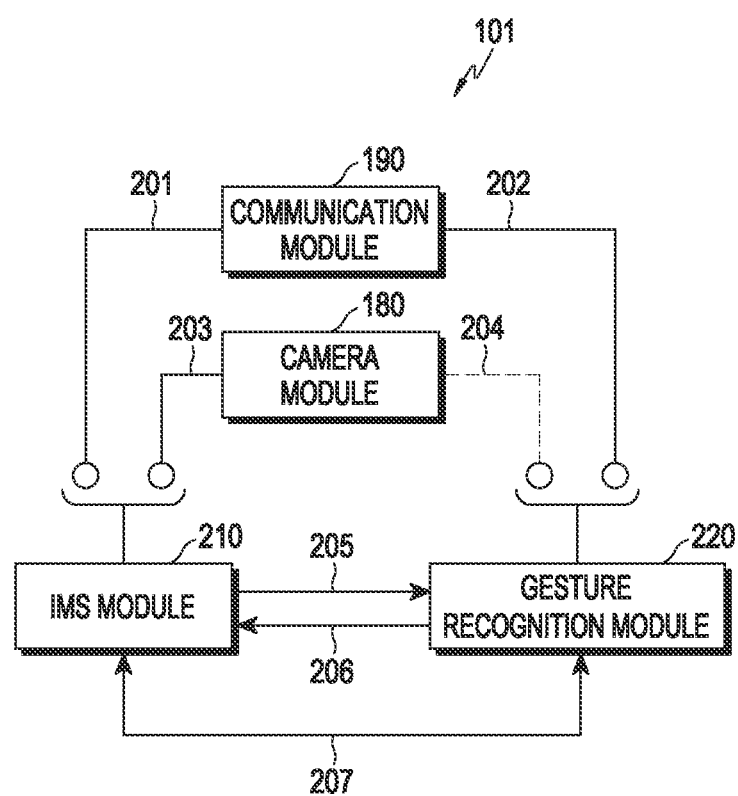
FIG. 3 is a block diagram illustrating an electronic device according to an embodiment of the disclosure.

FIG. 3 is a block diagram illustrating an electronic device according to an embodiment of the disclosure.

Referring to FIG. 3, in an embodiment of the disclosure, an electronic device 101 (e.g., at least one of the electronic device 101 of FIG. 1 or the electronic device 101 of FIG. 2) may include a communication module 190 (e.g., at least one of the communication module 190 of FIG. 1 or the communication module 190 of FIG. 2), a camera module 180 (e.g., at least one of the camera module 180 of FIG. 1 or the camera module 180 of FIG. 2), an ip multimedia subsystem (IMS) module 210, and a gesture recognition module 220.

In an embodiment of the disclosure, modules (e.g., at least one of the IMS module 210 or the gesture recognition module 220) implemented (or stored) in the electronic device 101 may be implemented in the form of an application, a program, computer code, instructions, routines, processes, software, firmware, or a combination of at least two thereof, executable by the processor 120. For example, when the modules are executed, the processor 120 may perform an operation corresponding to each module. Therefore, when it is described below that a specific module performs an operation, it may be understood as the processor 120 performing the operation corresponding to the specific module as the specific module is executed. In an embodiment of the disclosure, at least some of the modules may include, but are not limited to, a plurality of programs. Meanwhile, at least some of the modules may be implemented in a hardware form (e.g., a processing circuit (not shown)). In an embodiment of the disclosure, when the modules (e.g., at least one of the IMS module 210 or the gesture recognition module 220) are implemented on the Android operating system, they may be implemented as a service or an application.

In an embodiment of the disclosure, the IMS module 210 may be connected 201 with the communication module 190 through an interface (e.g., a hardware interface and/or a software interface), and/or may be connected 203 with the camera module 180 through an interface (e.g., a hardware interface and/or a software interface). For example, the processor 120 (e.g., the IMS module 210) and the communication module 190 may exchange commands or data, based on an interface, such as an MIPI. The processor 120 (e.g., the IMS module 210) and the camera module 180 may exchange commands or data, based on an interface, such as a camera serial interface (CSI). The communication method between the IMS module 210 and the communication module 190 and/or the communication method between the IMS module 210 and the camera module 180 is not limited to the above-described example. The IMS module 210 may identify a reception event of a voice call and/or a video call through the communication module 190. The IMS module 210 may hook one or more images captured by the camera module 180 based on identifying the reception event of the video call. In an embodiment of the disclosure, "hooking" may refer to a series of processes of generating a background screen and obtaining an image drawn on the background screen, in order to provide image information corresponding to one or more images to the gesture recognition module 220. Image hooking is described below with reference to FIGS. 6 and 7. In an embodiment of the disclosure, the image information provided by the IMS module 210 to the gesture recognition module 220 may be bitmap information for an image, but is not limited thereto. In an embodiment of the disclosure, the IMS module 210 may provide 205 image information corresponding to one or more hooked images to the gesture recognition module 220. In an embodiment of the disclosure, when the IMS module 210 and the gesture recognition module 220 are implemented as services on the Android operating system, the IMS module 210 may be bound 207 with the gesture recognition module 220 to transmit and receive data. In an embodiment of the disclosure, each of the services may start operating based on the onstartService( ) function being invoked, and may be bound 207 to each other based on the bindservice( ) function being invoked. Services may exchange data based on invocation of an interface function while being bound 207 to each other. For example, the processor 120 may execute the gesture recognition module 220 using data obtained based on executing the IMS module 210. When the gesture recognition module 220 is terminated, the IMS module 210 may release the binding 207 with the gesture recognition module 220. After the binding 207 is released, the IMS module 210 may stop exchanging data with the gesture recognition module 220 and operate in the background. The IMS module 210 may be terminated based on the received video call being rejected.

In an embodiment of the disclosure, the gesture recognition module 220 may recognize a gesture in conjunction with at least one module. The gesture recognition module 220 may be connected 202 with the communication module 190 through an interface (e.g., a hardware interface and/or a software interface), and/or may be connected 204 with the camera module 203 through an interface (e.g., a hardware interface and/or a software interface). For example, the processor 120 (e.g., the gesture recognition module 220) and the communication module 190 may exchange commands or data, based on an interface, such as an MIPI. The processor 120 (e.g., the gesture recognition module 220) and the camera module 180 may exchange commands or data, based on an interface, such as a CSI. The communication method between the gesture recognition module 220 and the communication module 190 and/or the communication method between the gesture recognition module 220 and the camera module 180 is not limited to the above-described example. The gesture recognition module 220 may identify whether a voice call or a video call is connected with an external electronic device (e.g., the external electronic device 104 of FIG. 1) through the communication module 190. The gesture recognition module 220 may be executed based on detection of a video call reception event. In an embodiment of the disclosure, the gesture recognition module 220 may receive data through the interface 204 connected to the camera module 180, based on the occurrence of the voice call reception event. Based on the occurrence of the video call reception event, the gesture recognition module 220 may receive image information based on binding 207 to the IMS module 210 instead of the interface 204 connected to the camera module 180. For example, when a video call reception event occurs, the video application may be occupied by a video engine. The gesture recognition module 180 may not receive image information from the camera module 180 while the video application is occupied by the video engine. The gesture recognition module 180 may receive information associated with the image hooked by the IMS module 210 while the binding 207 with the IMS module 210 is maintained.

In an embodiment of the disclosure, when a voice call reception event occurs, the gesture recognition module 220 may execute the camera module 180 in the background. When the camera module 180 is executed in the background, an external image of the electronic device 101 may be obtained even when a preview image is not displayed on the display module (e.g., at least one of the display module 160 of FIG. 1 or the display module 160 of FIG. 2). The gesture recognition module 220 may obtain the image information about the image captured by the camera module 180 through the interface 204 connected 204 to the camera module 180 based on the occurrence of the voice call reception event.

In an embodiment of the disclosure, based on the occurrence of the video call reception event, the gesture recognition module 220 may obtain 205 image information about the image hooked by the IMS module 210 in the state of binding 207 with the IMS module 210. In an embodiment of the disclosure, the gesture recognition module 220 may recognize the gesture of the electronic device 101 of the user, based on the obtained image information. The gesture recognition module 220 may request 206 the IMS module 210 to perform at least one operation corresponding to the recognized gesture, based on recognition of the user's gesture. For example, the gesture recognition module 220 may transmit a request to the IMS module 210 so that the IMS module 210 accepts or rejects the received call. The execution of the gesture recognition module 220 may be terminated based on at least one operation corresponding to the gesture recognized by the IMS module 210 being performed.

In an embodiment of the disclosure, when the IMS module 210 accepts the received voice call, the gesture recognition module 220 may maintain an active state for a preset time. For example, the gesture recognition module 220 may wait for a specified time (e.g., a time between 0 and 20 seconds) after the IMS module 210 accepts the received call. The gesture recognition module 220 may request the IMS module 210 to perform at least one operation corresponding to the additional gesture, based on recognition of the additional gesture during the wait time. For example, the gesture recognition module 220 may request the IMS module 210 to terminate the voice call. In an embodiment of the disclosure, the gesture recognition module 220 may release binding with the IMS module 210, based on failure to recognize the additional gesture during the wait time. For example, the gesture recognition module 220 may release binding with the IMS module 210, based on the invocation of the unbindService( ) function. The gesture recognition module 220 may stop exchanging data with the IMS module 210 after the binding is released, and it may be terminated based on the invocation of the onDestroy( ) function. For example, based on termination of the gesture recognition module 220, the memory allocated to the gesture recognition module 220 may be released.

Although FIG. 3 illustrates an example in which the electronic device 101 includes the communication module 190, the camera module 180, the IMS module 210, and/or the gesture recognition module 220, the disclosure is not limited thereto. Although FIG. 3 illustrates that the electronic device 101 includes the communication module 190, the camera module 180, the IMS module 210, and/or the gesture recognition module 220, the disclosure is not limited thereto. For example, the electronic device 101 may further include the display module 160 illustrated in FIG. 2.

Figure 4:
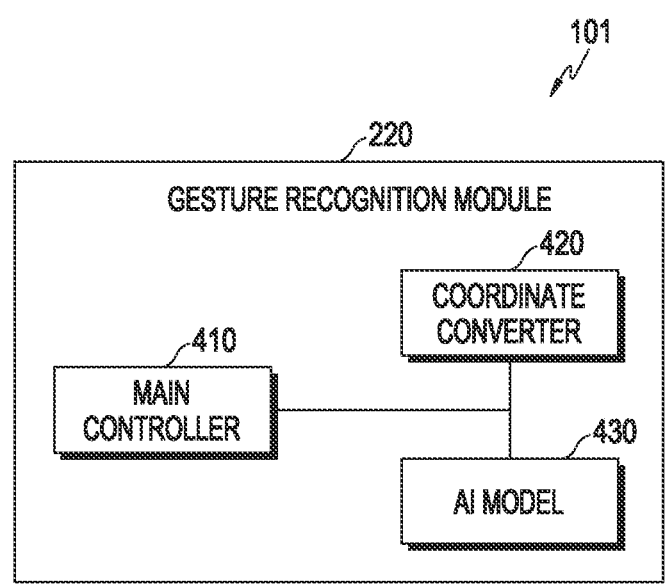
FIG. 4 is a block diagram illustrating an electronic device according to an embodiment of the disclosure.

FIG. 4 is a block diagram illustrating an electronic device according to an embodiment of the disclosure.

Referring to FIG. 4, in an embodiment of the disclosure, an electronic device 101 (e.g., at least one of the electronic device 101 of FIG. 1, the electronic device 101 of FIG. 2, or the electronic device 101 of FIG. 3) may include a gesture recognition module 220 including a main controller 410, a coordinate converter 420, and an artificial intelligence (AI) model 430.

In an embodiment of the disclosure, the main controller 410 may perform interface communication with other modules (e.g., the camera module 180 of FIG. 3, the communication module 190 of FIG. 3, and/or the IMS module 210 of FIG. 3). The main controller 410 may control the operation of the coordinate converter 420 and/or the AI model 430. The main controller 410 may recognize a gesture based on an output of the coordinate converter 420 and/or the AI model 430. Specific operations of the main controller 410 are described below with reference to FIGS. 8 and 9.

In an embodiment of the disclosure, the coordinate converter 420 may receive image information and convert the input image information into coordinate data. For example, the coordinate converter 420 may receive bitmap information about the image and convert the input bitmap information into three-dimensional absolute coordinates and/or two-dimensional relative coordinates, and the image information and coordinate data are not limited to the above-described example. The coordinate converter 420 may be an artificial intelligence (AI) model pre-trained to output coordinate data based on input image information. The coordinate converter 420 may be trained to output coordinate data associated with an object included in the image by using a still image and/or a dynamic image as training data. In an embodiment of the disclosure, the three-dimensional (3D) absolute coordinates output by the coordinate converter 420 may be one or more 3D coordinates corresponding to an object included in the image. For example, the coordinate converter 420 may output one or more 3D coordinates representing at least a part (e.g., a joint of a hand) of the user's body included in the image, and the object to be recognized in the image is not limited thereto. In an embodiment of the disclosure, the two-dimensional (2D) relative coordinates output by the coordinate converter 420 may be 2D coordinates indicating the relative location of the object in the 2D image.

In an embodiment of the disclosure, the artificial intelligence model 430 may receive at least a portion of coordinate data output by the coordinate converter 420 and output an index corresponding to the input coordinate data. In an embodiment of the disclosure, the index output from the artificial intelligence model 430 may be information indicating a shape of an object included in an image input to the gesture recognition module 220. When the artificial intelligence model 430 outputs the same index from different input data, it may mean that the shape of the object corresponding to the input data is substantially the same. In an embodiment of the disclosure, the artificial intelligence model 430 may be pre-trained to output the shape of the object included in the image from the input coordinate data. The artificial intelligence model 430 may be trained to reduce a loss between the shape of the object estimated by the artificial intelligence model 430 and the shape of the labeled object, based on training data in which the shape of the object positioned in the image is labeled. In an embodiment of the disclosure, refined coordinate data may be input to the artificial intelligence model 430. The format of the output data of the coordinate converter 420 may be a data structure format (e.g., class) set corresponding to the coordinate converter 420. The main controller 410 may obtain 3D absolute coordinates and/or 2D relative coordinates from the output data of the coordinate converter 420. The artificial intelligence model 430 may receive the 3D absolute coordinates obtained by the main controller 410, and output an index indicating the shape of the object corresponding to the input coordinate data. In an embodiment of the disclosure, the 3D absolute coordinates output by the coordinate converter 420 may be stored in a data buffer. At least some of the 3D absolute coordinates stored in the data buffer may be input to the artificial intelligence model 430. The artificial intelligence model 430 may receive at least some of the 3D absolute coordinates stored in the data buffer and output an index indicating the shape of the object corresponding to the input coordinate data. A data buffer storing input data input to the artificial intelligence model 430, output data output from the artificial intelligence model 430, and an output of the coordinate converter 420 is described with reference to FIGS. 8 to 11.

Figure 5:
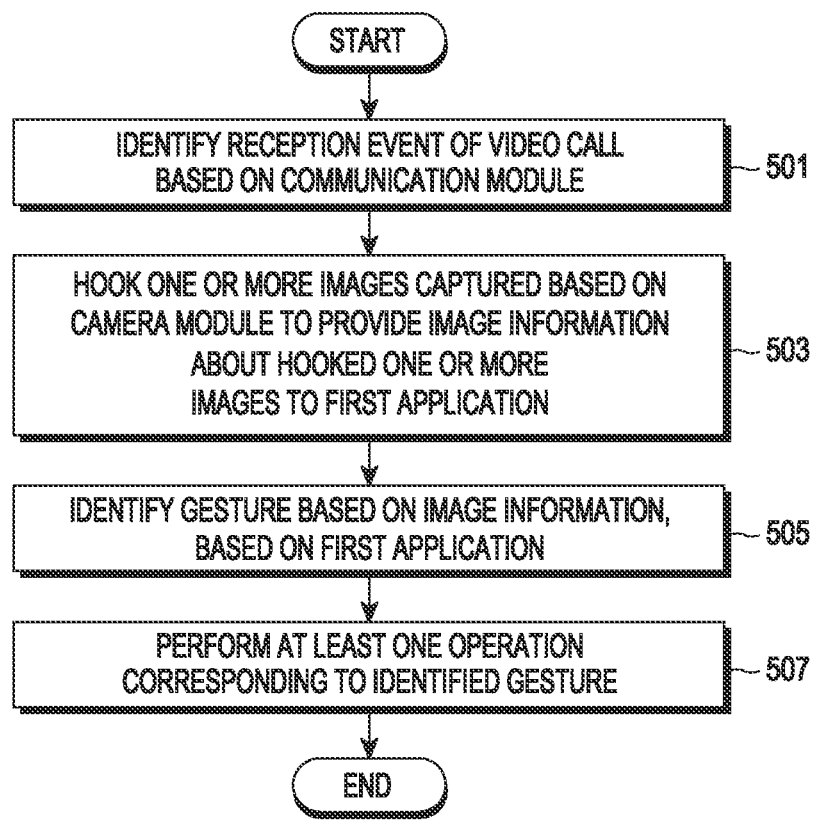
FIG. 5 is a flowchart illustrating operations of an electronic device according to an embodiment of the disclosure.

FIG. 5 is a flowchart illustrating operations of an electronic device according to an embodiment of the disclosure.

According to an embodiment of the disclosure, an electronic device (e.g., at least one of the electronic device 101 of FIG. 1, the electronic device 101 of FIG. 2, the electronic device 101 of FIG. 3, or the electronic device 101 of FIG. 4) (e.g., a processor (e.g., at least one of the processor 120 of FIG. 1 or the processor 120 of FIG. 2) may identify a reception event of a video call, based on a communication module (e.g., at least one of the communication module 190 of FIG. 1, the communication module 190 of FIG. 2, or the communication module 190 of FIG. 3) in operation 501. In an embodiment of the disclosure, the communication module 190 may receive a request for a voice call and/or a video call from an external electronic device (e.g., the external electronic device 104 of FIG. 1) through a network (e.g., the second network 199 of FIG. 1). In operation 503, the electronic device 101 may hook one or more images captured based on the camera module (e.g., at least one of the camera module 180 of FIG. 1, the camera module 180 of FIG. 2, or the camera module 180 of FIG. 3) to provide image information corresponding to the hooked one or more images to the first application. For example, the electronic device 101 may hook one or more images captured by the camera module 180, based on generating the background screen. The electronic device 101 may provide the one or more hooked images to a gesture recognition module (e.g., the gesture recognition module 220 of FIG. 3). The electronic device 101 may provide the gesture recognition module 220 with one or more images hooked in the form of bitmap information. An operation in which the electronic device 101 hooks one or more images captured by the camera module 180 is described below with reference to FIGS. 6 and 7.

In an embodiment of the disclosure, in operation 505, the electronic device 101 may identify a gesture based on information output from the first application, by inputting the image information to the first application. For example, based on the operation of the gesture recognition module 220, the electronic device 101 may identify a gesture of the user of the electronic device 101 from image information about one or more images input to the gesture recognition module 220. The gesture identification operation of the electronic device 101 is described below with reference to FIGS. 8 to 12, 13A and 13B. In operation 507, the electronic device 101 may perform at least one operation corresponding to the identified gesture. For example, the electronic device 101 may perform an operation of accepting the received call, based on identifying that the gesture is a gesture of accepting the received call. The electronic device 101 may perform an operation of rejecting the received call, based on identifying that the gesture is a gesture of rejecting the received call. In an embodiment of the disclosure, the electronic device 101 may identify the user's gesture by recognizing the shape of at least a part of the user's body capable of determining the gesture, based on the image captured by the camera module 180, without hardware (e.g., a glove sensor) for detecting the user's gesture or an external electronic device (e.g., the external electronic device 102 of FIG. 1). By performing at least one operation corresponding to the identified gesture, the electronic device 101 may accept or reject the received call without the user's contact with the electronic device 101 (e.g., the user's touch event to a display module (e.g., at least one of the display module 160 of FIG. 1 or the display module 160 of FIG. 2)).

Figure 6:
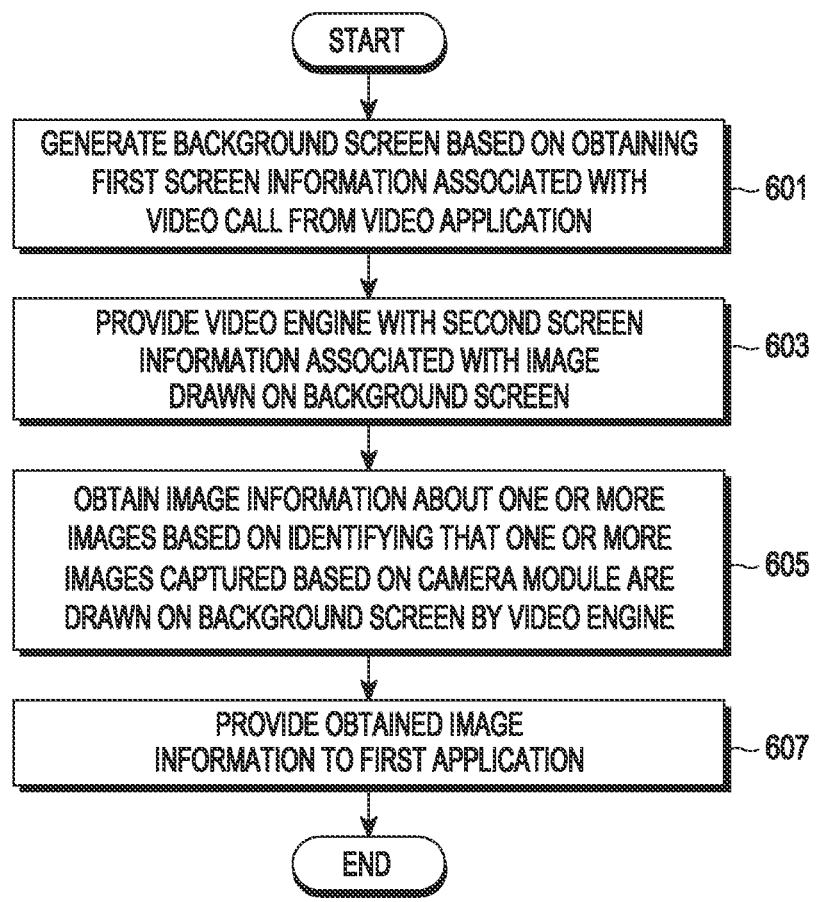
FIG. 6 is a flowchart illustrating operations of an electronic device according to an embodiment of the disclosure.

FIG. 6 is a flowchart illustrating operations of an electronic device according to an embodiment of the disclosure.

According to an embodiment of the disclosure, an electronic device (e.g., at least one of the electronic device 101 of FIG. 1, the electronic device 101 of FIG. 2, the electronic device 101 of FIG. 3, or the electronic device 101 of FIG. 4) (e.g., a processor (e.g., at least one of the processor 120 of FIG. 1 or the processor 120 of FIG. 2) may generate a background screen based on obtaining first screen information associated with a video call from a video application in operation 601. In an embodiment of the disclosure, the video application may transmit first screen information associated with a video call to an IMS module (e.g., the IMS module 210 of FIG. 3). In an embodiment of the disclosure, the first screen information may include location information in which an image is drawn on a screen of a video application. In an embodiment of the disclosure, the screen of the video application may be displayed on a display module (e.g., at least one of the display module 160 of FIG. 1 or the display module 160 of FIG. 2) when the image is drawn on the screen of the video application. The electronic device 101 may generate a background screen based on obtaining first screen information to hook one or more images captured by a camera module (e.g., at least one of the camera module 180 of FIG. 1, the camera module 180 of FIG. 2, or the camera module 180 of FIG. 3). In an embodiment of the disclosure, the background screen may not be displayed on the display module 160 when one or more images are drawn on the background screen. In operation 603, the electronic device 101 may provide the video engine with the second screen information associated with the image drawn on the background screen. In an embodiment of the disclosure, the second screen information may include location information in which an image is drawn on the background screen. When the video call is received, the video engine may transmit a control signal to the camera module 180. The gesture recognition module (e.g., at least one of the gesture recognition module 220 of FIG. 3 or the gesture recognition module 220 of FIG. 4) may not be bound to the camera module 180 because the camera module 180 is first occupied by the video engine when the video call is received.

In an embodiment of the disclosure, in operation 605, the electronic device 101 may obtain image information corresponding to the one or more images, based on identifying that the one or more images captured based on the camera module 180 are drawn on the background screen by the video engine. The video engine may draw one or more images captured by the camera module 180 on the background screen, based on controlling the operation of the camera module 180. The electronic device 101 may obtain image information associated with one or more images based on identifying that one or more images are drawn on the background screen generated by operation 601. For example, the electronic device 101 may hook bitmap information about one or more images, and the image information is not limited thereto. In an embodiment of the disclosure, the electronic device 101 may hook one or more images captured by the camera module 180 even when the camera module 180 is occupied by the video engine. In an embodiment of the disclosure, in operation 607, the electronic device 101 may provide the obtained image information to the first application. For example, the electronic device 101 may provide the gesture recognition module 220 with one or more images obtained based on image hooking. In an embodiment of the disclosure, when receiving a video call, the electronic device 101 may provide the gesture recognition module 220 with one or more hooked images, based on generating the background screen.

Figure 7:
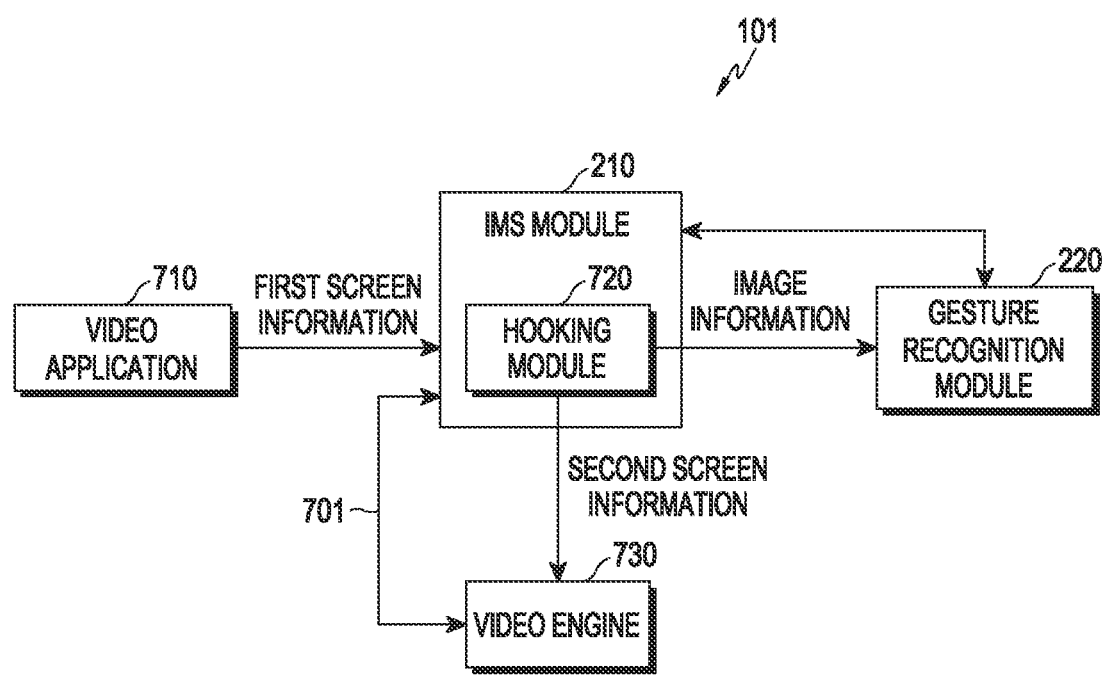
FIG. 7 is a view illustrating image hooking according to an embodiment of the disclosure.

FIG. 7 is a view illustrating image hooking according to an embodiment of the disclosure.

Referring to FIG. 7, a video application 710 may provide first screen information to the IMS module 210. In an embodiment of the disclosure, the video application 710 may operate as an application of a higher layer than the IMS module 210. The first screen information may include location information in which an image is drawn on the screen of the video application 710. In an embodiment of the disclosure, the screen of the video application 710 may be displayed on a display module (e.g., at least one of the display module 160 of FIG. 1 or the display module 160 of FIG. 2) when the image is drawn on the screen of the video application 710. The IMS module 210 (e.g., a hooking module 720) may generate a background screen based on obtaining first screen information associated with a video call from the video application 710. In an embodiment of the disclosure, the background screen may not be displayed on the display module 160 when one or more images are drawn on the background screen. The IMS module 210 may provide a video engine 730 with second screen information associated with the image drawn on the background screen. In an embodiment of the disclosure, the IMS module 210 may provide second screen information to the video engine 730 based on binding 701 to the video engine 730. In an embodiment of the disclosure, the second screen information may include location information in which an image is drawn on the background screen. When the video call is received, the video engine 730 may transmit a control signal to the camera module 180. The gesture recognition module 220 (e.g., at least one of the gesture recognition module 220 of FIG. 3 or the gesture recognition module 220 of FIG. 4) may not be bound to the camera module 180 because the camera module 180 is first occupied by the video engine 730 when the video call is received.

In an embodiment of the disclosure, the IMS module 210 may obtain image information about the one or more images, based on identifying that the one or more images captured based on the camera module 180 are drawn on the background screen by the video engine 730. The video engine 730 may draw one or more images captured by the camera module 180 on the background screen, based on controlling the operation of the camera module 180. The IMS module 210 may hook bitmap information about one or more images based on identifying that the images are drawn on the background screen, and the image information is not limited thereto. In an embodiment of the disclosure, the IMS module 210 may hook one or more images captured by the camera module 180 even when the camera module 180 is occupied by the video engine 730. In an embodiment of the disclosure, the IMS module 210 may provide the obtained image information to the first application. For example, the IMS module 210 may provide the gesture recognition module 220 with one or more images obtained based on image hooking. In an embodiment of the disclosure, the IMS module 210 may transmit image information corresponding to one or more hooked images to the gesture recognition module 220, based on binding 702 to the gesture recognition module 220. In an embodiment of the disclosure, when receiving a video call, the IMS module 210 may provide the gesture recognition module 220 with one or more hooked images, based on generating the background screen.

Figure 8:
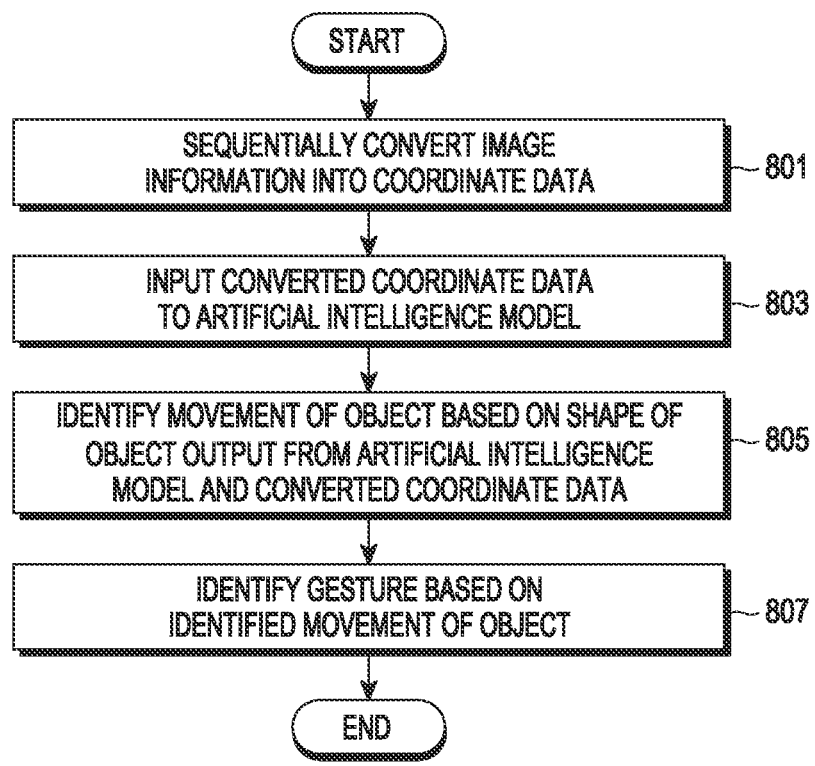
FIG. 8 is a flowchart illustrating operations of an electronic device according to an embodiment of the disclosure.

FIG. 8 is a flowchart illustrating operations of an electronic device according to an embodiment of the disclosure.

Referring to FIG. 8, an electronic device (e.g., at least one of the electronic device 101 of FIG. 1, the electronic device 101 of FIG. 2, the electronic device 101 of FIG. 3, or the electronic device 101 of FIG. 4) (e.g., a processor (e.g., at least one of the processor 120 of FIG. 1 or the processor 120 of FIG. 2) may sequentially convert image information into coordinate data in operation 801. The electronic device 101 may sequentially convert image information corresponding to the one or more images into coordinate data corresponding to an object included in each of at least some images among the one or more images. In an embodiment of the disclosure, the electronic device 101 may output 3D absolute coordinates and/or 2D relative coordinates, based on the input image information. For example, the electronic device 101 may output 3D absolute coordinates and/or 2D relative coordinates associated with the hand based on recognition of the hand of the user of the electronic device 101 in the input image. In operation 803, the electronic device 101 may map an object included in each of the at least some images to the location of the display module (e.g., at least one of the display module 160 of FIG. 1 or the display module 160 of FIG. 2), based on the sequentially converted coordinate data. In an embodiment of the disclosure, the electronic device 101 may map the location of the user's hand on the display module 160, based on 2D relative coordinates, based on the specifications of the display module 160 corresponding to the electronic device 101.

In an embodiment of the disclosure, in operation 805, the electronic device 101 may identify the movement of the object, based on identifying a change in the shape of the object output from the artificial intelligence model (e.g., the artificial intelligence model 430 of FIG. 4) and the mapped location. For example, the electronic device 101 may track the change in the location of the hand of the user of the electronic device 101 according to the shape of the object output from the artificial intelligence model 430. The electronic device 101 may identify the movement of the object based on tracking the change in the location of the user's hand. In operation 807, the electronic device 101 may identify a gesture, based on the identified movement of the object. In an embodiment of the disclosure, the electronic device 101 may identify the user's gesture, based on the movement of the preset hand associated with the acceptance or rejection of the call. For example, the electronic device 101 may identify that the user's gesture is a gesture of accepting the received call, based on identifying that the movement of the hand is a preset movement indicating acceptance of the call. The electronic device 101 may identify that the user's gesture is a gesture of rejecting the received call, based on identifying that the movement of the hand is a preset movement indicating rejection of the call.

Figure 9:
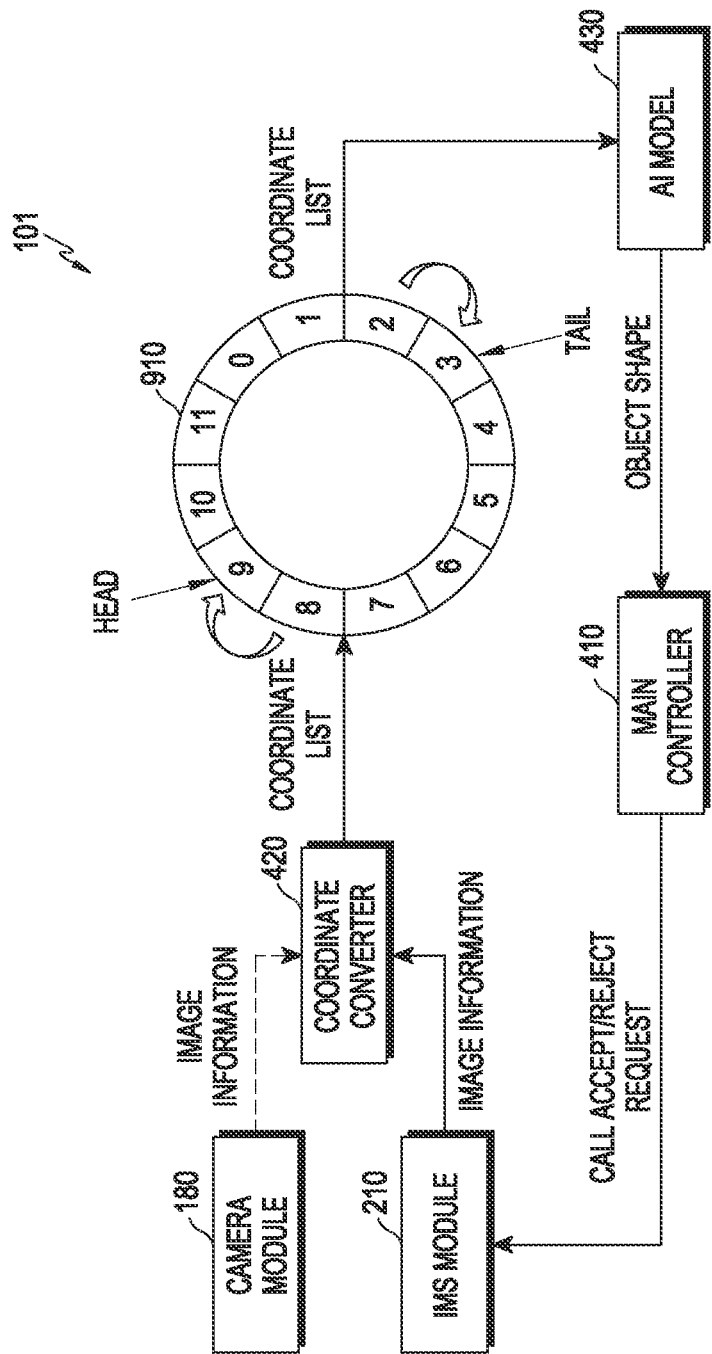
FIG. 9 is a view illustrating a gesture recognition process of an electronic device according to an embodiment of the disclosure.

FIG. 9 is a view illustrating a gesture recognition process of an electronic device according to an embodiment of the disclosure.

Referring to FIG. 9, the coordinate converter 420 (e.g., the coordinate converter 420 of FIG. 4) may obtain image information corresponding to one or more images from a camera module (e.g., at least one of the camera module 180 of FIG. 1, the camera module 180 of FIG. 2, or the camera module 180 of FIG. 3) or an IMS module 210 (e.g., the IMS module 210 of FIG. 3) based on identification of a call reception event. In an embodiment of the disclosure, the coordinate converter 420 may obtain image information from the camera module 180 based on identification of a voice call reception event. In an embodiment of the disclosure, based on the occurrence of the voice call reception event, the gesture recognition module (e.g., the gesture recognition module 220 of FIG. 4) may be bound to the camera module 180. The coordinate converter 420 may obtain raw data from the camera module 180 based on identifying the reception event of the voice call, and the image information is not limited thereto. In an embodiment of the disclosure, the gesture recognition module 220 may determine the format and/or size of raw data acquired from the camera module 180. For example, the format of the raw data may be a YUV420 color format or a JPG format, but is not limited thereto. In an embodiment of the disclosure, the image reception speed of the YUV420 format may be, on average, about 15 milliseconds (ms) faster than the image reception speed of the JPG format, for a size of 640×480. The size of the raw data may be determined as a size of width×height. The size of the raw data may be at least one of 1280×960, 640×480, or 320×240, but is not limited thereto. In an embodiment of the disclosure, when the size of the raw data is 1280×960, the image reception speed of the YUV420 format may be, on average, about 7 ms faster than when the size of the raw data is 640×480. The image reception speed of the YUV420 format may be, on average, about 10 ms faster when the size of the raw data is 640×480, than when the size of the raw data is 320×240. In an embodiment of the disclosure, the image reception speed may increase as the size of the raw data is closer to the resolution of the electronic device 101. For example, when the raw data is excessively large, such as 1600×1200, an error may occur in image reception. In an embodiment of the disclosure, when the image reception speed of the gesture recognition module 220 increases, the speed of the image processing logic may be enhanced. In an embodiment of the disclosure, the gesture recognition module 220 (e.g., the main controller 410) may convert the obtained raw data of the YUV420 format into an ARGB8888 format including opaque information (alpha), thereby enhancing the image processing speed. The gesture recognition module 220 may convert the image converted to the ARGB8888 format into a bitmap format and input the bitmap information to the coordinate converter 420. In an embodiment of the disclosure, the coordinate converter 420 may obtain image information from the IMS module 210 based on identification of a video call reception event. For example, the coordinate converter 420 may obtain bitmap information from the IMS module 210.

In an embodiment of the disclosure, the coordinate converter 420 may sequentially convert image information into coordinate data. The coordinate converter 420 may sequentially convert image information corresponding to the one or more images into coordinate data corresponding to an object included in each of at least some images among the one or more images. In an embodiment of the disclosure, the coordinate converter 420 may output 3D absolute coordinates and/or 2D relative coordinates, based on the input image information. For example, the coordinate converter 420 may output 3D absolute coordinates and/or 2D relative coordinates associated with the hand based on recognition of the hand of the user of the electronic device 101 in the input image. In an embodiment of the disclosure, the gesture recognition module 220 may store the sequentially converted coordinate data in the data buffer 910. In an embodiment of the disclosure, the data buffer 910 may store a predetermined number of pieces of data. For example, referring to FIG. 9, the data buffer 910 may store 12 pieces of coordinate data sequentially input, but is not limited thereto. In an embodiment of the disclosure, the gesture recognition module 220 may input coordinate data stored in the data buffer 910 to the artificial intelligence model, based on identifying that no object is detected from one or more images during the wait time of the data buffer 910. For example, the gesture recognition module 220 may input data corresponding to the head of the data buffer 910 to data corresponding to the tail to the artificial intelligence model 430, based on identifying that the user's hand is not detected from the image for a specified time (e.g., about 300 ms). The gesture recognition module 220 may identify a shape corresponding to an object included in each of at least some images among the one or more images output from an artificial intelligence model 430 for object shape estimation, trained to output data indicating a shape of an object by receiving coordinate data corresponding to an object included in an image as an input to output data indicating the shape of the object, by inputting coordinate data corresponding to an object included in the at least some images to the artificial intelligence model 430. In an embodiment of the disclosure, the main controller 410 may map an object included in each of at least some images to the location of the display module 160, based on the sequentially converted coordinate data. In an embodiment of the disclosure, the main controller 410 may map the location of the user's hand on the display module 160, based on 2D relative coordinates, based on the specifications of the display module 160 corresponding to the electronic device 101. The main controller 410 may identify the movement of the object, based on identifying a change in the shape of the object output from the artificial intelligence model 430 and the mapped location. For example, the main controller 410 may track the change in the location of the hand of the user of the electronic device 101 according to the shape of the object output from the artificial intelligence model 430. The main controller 410 may identify the movement of the object based on tracking the change in the location of the user's hand. The main controller 410 may identify a gesture, based on the identified movement of the object. In an embodiment of the disclosure, the main controller 410 may identify the user's gesture, based on the movement of the preset hand associated with the acceptance or rejection of the call. For example, the main controller 410 may identify that the user's gesture is a gesture of accepting the received call, based on identifying that the movement of the hand is a preset movement indicating acceptance of the call. The main controller 410 may identify that the user's gesture is a gesture of rejecting the received call, based on identifying that the movement of the hand is a preset movement indicating rejection of the call. In an embodiment of the disclosure, the main controller 410 may request the IMS module 210 to perform at least one operation corresponding to the identified gesture. The IMS module 210 may accept the received call according to the call acceptance request of the main controller 410. The IMS module 210 may reject the received call according to the call rejection request of the main controller 410.

Figure 10:
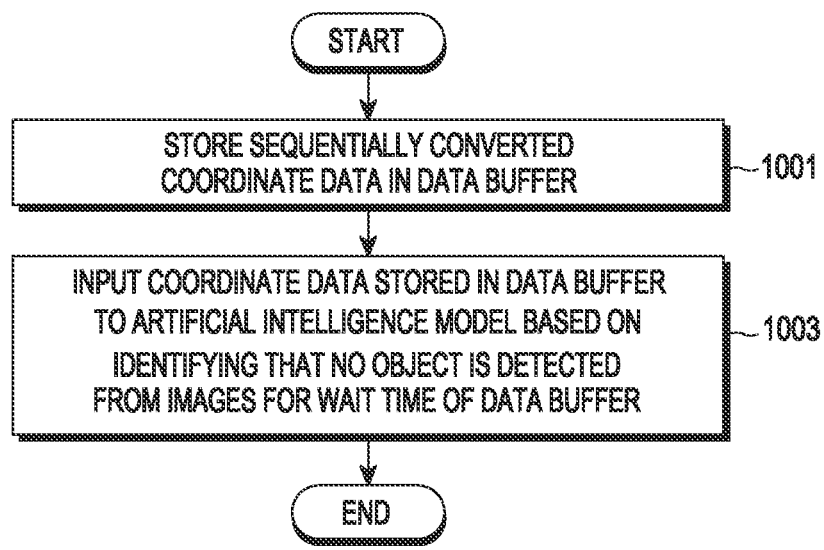
FIG. 10 is a flowchart illustrating operations of an electronic device according to an embodiment of the disclosure.

FIG. 10 is a flowchart illustrating operations of an electronic device according to an embodiment of the disclosure.

According to an embodiment of the disclosure, an electronic device (e.g., at least one of the electronic device 101 of FIG. 1, the electronic device 101 of FIG. 2, the electronic device 101 of FIG. 3, or the electronic device 101 of FIG. 4) (e.g., a processor (e.g., at least one of the processor 120 of FIG. 1 or the processor 120 of FIG. 2) may store the sequentially converted coordinate data in a data buffer (e.g., the data buffer 910 of FIG. 9) in operation 1001. In an embodiment of the disclosure, the data buffer 910 may store a predetermined number of pieces of data. For example, referring to FIG. 9, the data buffer 910 may store 12 pieces of coordinate data sequentially input, but is not limited thereto. In operation 1003, the electronic device 101 may input coordinate data stored in the data buffer 910 to an artificial intelligence model (e.g., the artificial intelligence model 430 of FIG. 9), based on identifying that no object is detected from the images during the wait time of the data buffer 910. For example, the gesture recognition module 220 may input data corresponding to the head of the data buffer 910 to data corresponding to the tail to the artificial intelligence model 430, based on identifying that the user's hand is not detected from the image for a specified time (e.g., about 300 ms), but the disclosure is not limited.

Figure 11:
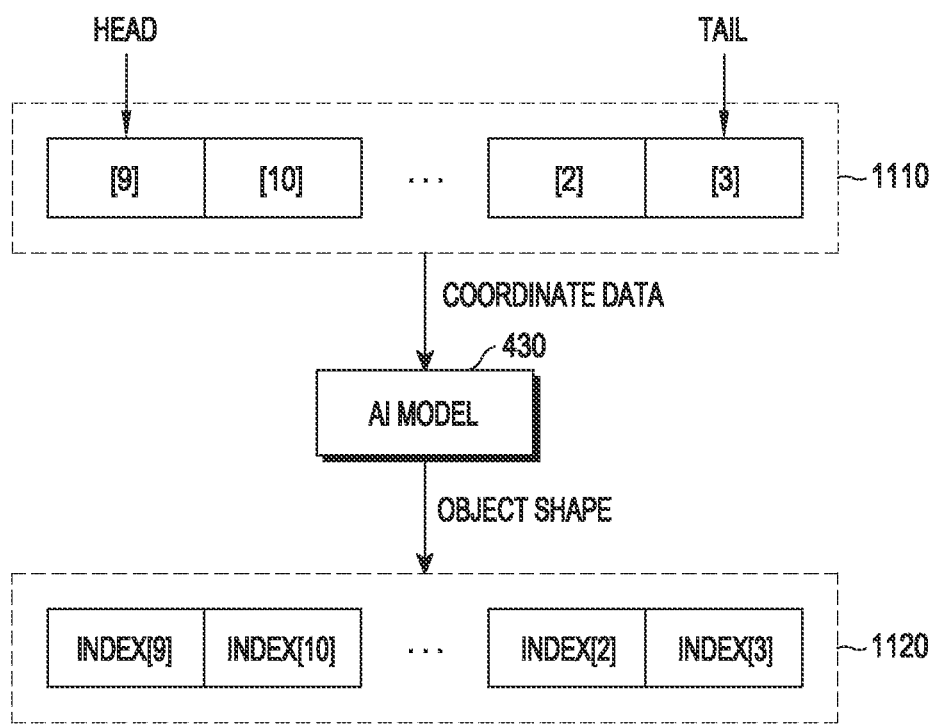
FIG. 11 is a view illustrating an artificial intelligence (AI) model for estimating an object shape according to an embodiment of the disclosure.

FIG. 11 is a view illustrating an AI model for estimating an object shape according to an embodiment of the disclosure.

Referring to FIG. 11, the AI model 430 may output an object shape list 1120, based on receiving an input data list 1110 stored in the data buffer 910. In an embodiment of the disclosure, the index may be information indicating at least a part of the user's body. In an embodiment of the disclosure, the number of pieces of data included in the input data list 1110 may correspond to the number of pieces of data included in the object shape list 1120.

Figure 12:
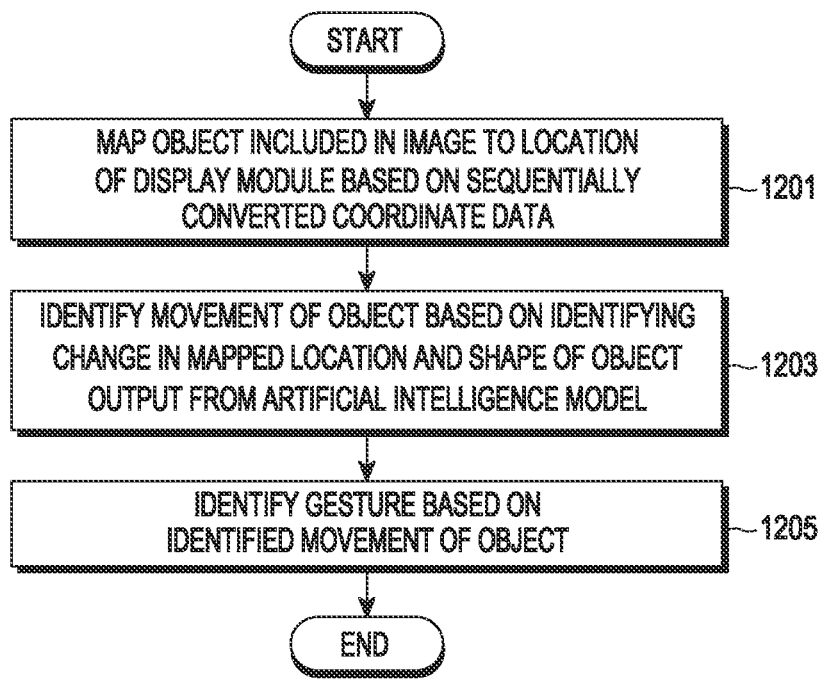
FIG. 12 is a flowchart illustrating operations of an electronic device according to an embodiment of the disclosure.

FIG. 12 is a flowchart illustrating operations of an electronic device according to an embodiment of the disclosure.

Referring to FIG. 12, an electronic device (e.g., at least one of the electronic device 101 of FIG. 1, the electronic device 101 of FIG. 2, the electronic device 101 of FIG. 3, or the electronic device 101 of FIG. 4) (e.g., a processor (e.g., at least one of the processor 120 of FIG. 1 or the processor 120 of FIG. 2) may map an object included in each of the at least some images to a location of a display module (e.g., at least one of the display module 160 of FIG. 1 or the display module 160 of FIG. 2) based on sequentially converted coordinate data in operation 1201. In an embodiment of the disclosure, the electronic device 101 may map the location of the user's hand on the display module 160, based on 2D relative coordinates, based on the specifications of the display module 160 corresponding to the electronic device 101. In an embodiment of the disclosure, in operation 1203, the electronic device 101 may identify the movement of the object, based on identifying a change in the shape of the object output from the artificial intelligence model (e.g., the artificial intelligence model 430 of FIG. 9) and the mapped location. For example, the electronic device 101 may track the change in the location of the hand of the user of the electronic device 101 according to the shape of the object output from the artificial intelligence model 430. The electronic device 101 may identify the movement of the object based on tracking the change in the location of the user's hand. In operation 1205, the electronic device 101 may identify a gesture, based on the identified movement of the object. In an embodiment of the disclosure, the electronic device 101 may identify the user's gesture, based on the movement of the preset hand associated with the acceptance or rejection of the call. For example, the electronic device 101 may identify that the user's gesture is a gesture of accepting the received call, based on identifying that the movement of the hand is a preset movement indicating acceptance of the call. The electronic device 101 may identify that the user's gesture is a gesture of rejecting the received call, based on identifying that the movement of the hand is a preset movement indicating rejection of the call.

Figure 13A:
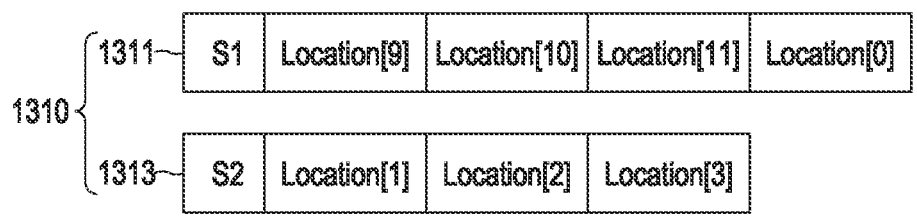
FIG. 13A is a view illustrating a process of classifying an output of an AI model of an electronic device according to an embodiment of the disclosure.

FIG. 13A is a view illustrating a process of classifying an output of an AI model of an electronic device according to an embodiment of the disclosure.

Referring to FIG. 13A, an electronic device 101 (e.g., at least one of the electronic device 101 of FIG. 1, the electronic device 101 of FIG. 2, the electronic device 101 of FIG. 3, or the electronic device 101 of FIG. 4) may classify an output of an AI model (e.g., the AI model 430 of FIG. 11). For example, the electronic device 101 may classify the output of the AI model 430 into one or more location lists 1310. The electronic device 101 may classify a first location list 1311 and a second location list 1313 based on recognizing the object of the first type. The electronic device 101 may track the change in the location of the hand of the user of the electronic device 101 according to the shape of the object output from the artificial intelligence model 430. The electronic device 101 may identify the movement of the object based on tracking the change in the location of the user's hand. For example, the electronic device 101 may track the location of the first type object by mapping data included in the first location list 1311. The electronic device 101 may track the location of the second type object by mapping data included in the second location list 1313.

Figure 13B:
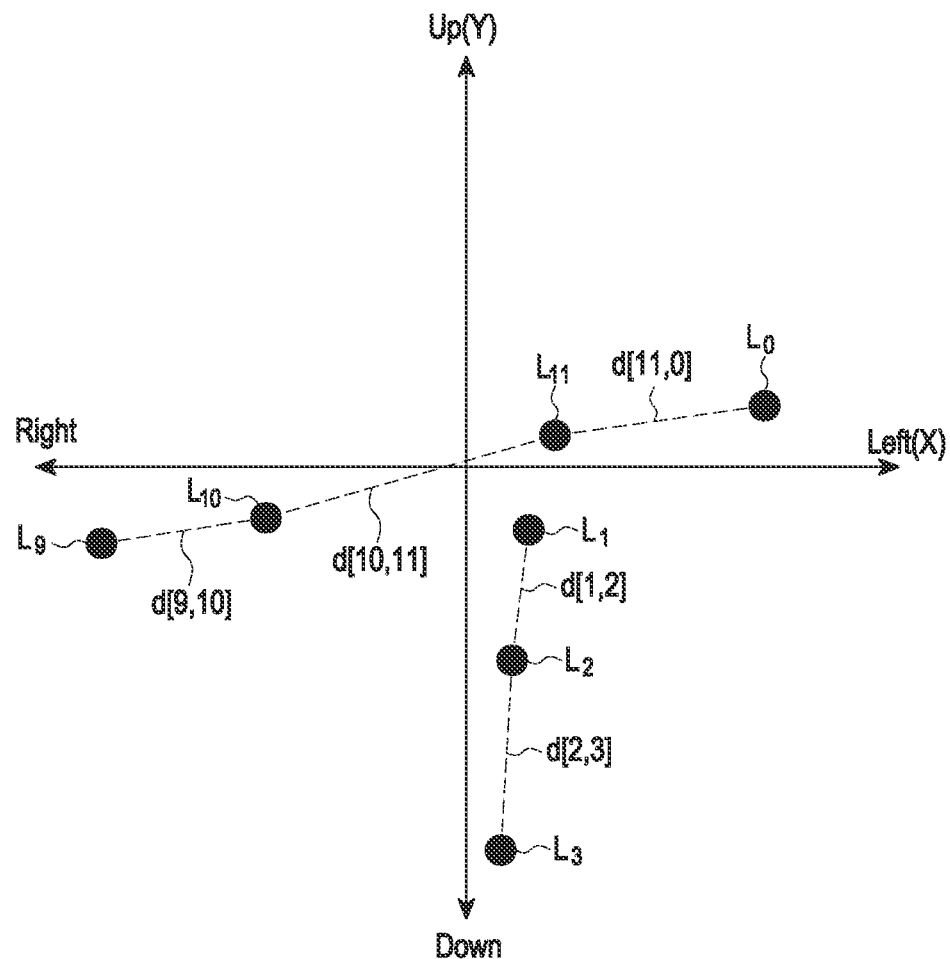
FIG. 13B is a view illustrating a process of mapping an output of an AI model of an electronic device according to an embodiment of the disclosure.

FIG. 13B is a view illustrating a process of mapping an output of an AI model of an electronic device according to an embodiment of the disclosure.

Referring to FIG. 13B, the electronic device 101 may map the location of the object according to the shape of the object and may track the location change of the object. The electronic device 101 may identify that the object moves from right to left, based on mapping data included in the first location list 1311 (e.g., the first location list 1311 of FIG. 13A) onto the display module 160. The electronic device 101 may identify that the object moves from up to down, based on mapping data included in the second location list 1313 (e.g., the second location list 1313 of FIG. 13A) onto the display module 160. The electronic device 101 may identify a number of effective movements respectively corresponding to at least one shape for the object. For example, the electronic device 101 may, as at least part of identifying the number of the effective movements, identify the effective movement based on identifying that a change in the mapped location is a preset reference (threshold) value or more. For example, the electronic device 101 may identify an effective movement based on identifying that a distance (e.g., d[i, i+1]) between mapped consecutive locations is larger than or equal to the reference value. In an embodiment of the disclosure, the number of mapped locations corresponding to at least one shape for the object and the reference value may be set to be proportional to each other. For example, when the number of mapped locations is 2 to 5, the electronic device 101 may set the reference value to 70 to 80 pixels considering the movement of the user's hand at a high speed. When the number of mapped locations is 2 to 5, even when one effective movement is detected, the electronic device 101 may determine the direction of the object. When the number of mapped locations is 6 to 12, the electronic device 101 may set the reference value to 80 to 100 pixels considering the movement of the user's hand at a slow speed. When the number of mapped locations is 6 to 12, and when two effective movements are detected, the electronic device 101 may determine the direction of the object. The electronic device 101 may identify the gesture based on the shape having the largest number of effective movements obtained. The electronic device 101 may determine the direction of the movement of the object based on identifying that the number (e.g., three) of effective movements from right to left is larger than the number (e.g., two) of effective movements in the direction from top to bottom.

Figure 14:
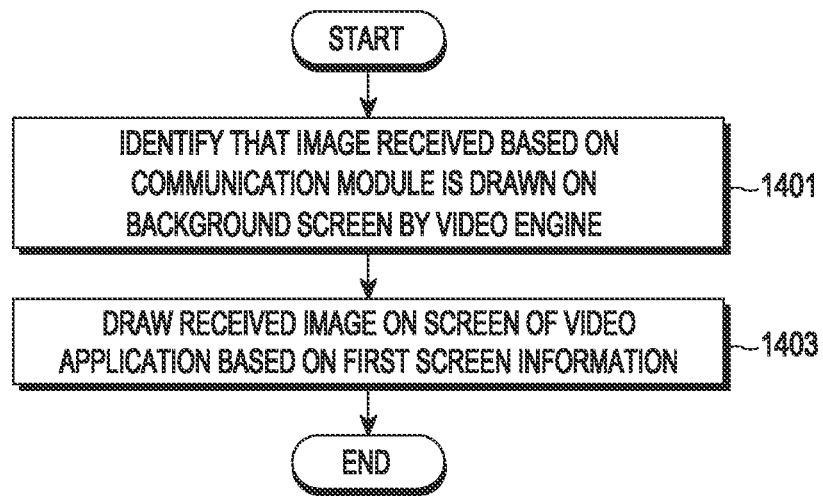
FIG. 14 is a flowchart illustrating operations of an electronic device according to an embodiment of the disclosure.

FIG. 14 is a flowchart illustrating operations of an electronic device according to an embodiment of the disclosure.

Referring to FIG. 14, an electronic device (e.g., at least one of the electronic device 101 of FIG. 1, the electronic device 101 of FIG. 2, the electronic device 101 of FIG. 3, or the electronic device 101 of FIG. 4) (e.g., a processor (e.g., at least one of the processor 120 of FIG. 1 or the processor 120 of FIG. 2) may identify that an image received based on the communication module 190 is drawn by the video engine on the background screen in operation 1401. In operation 1403, the electronic device 101 may draw the received image on the screen of the video application based on the first screen information.

Figure 15:
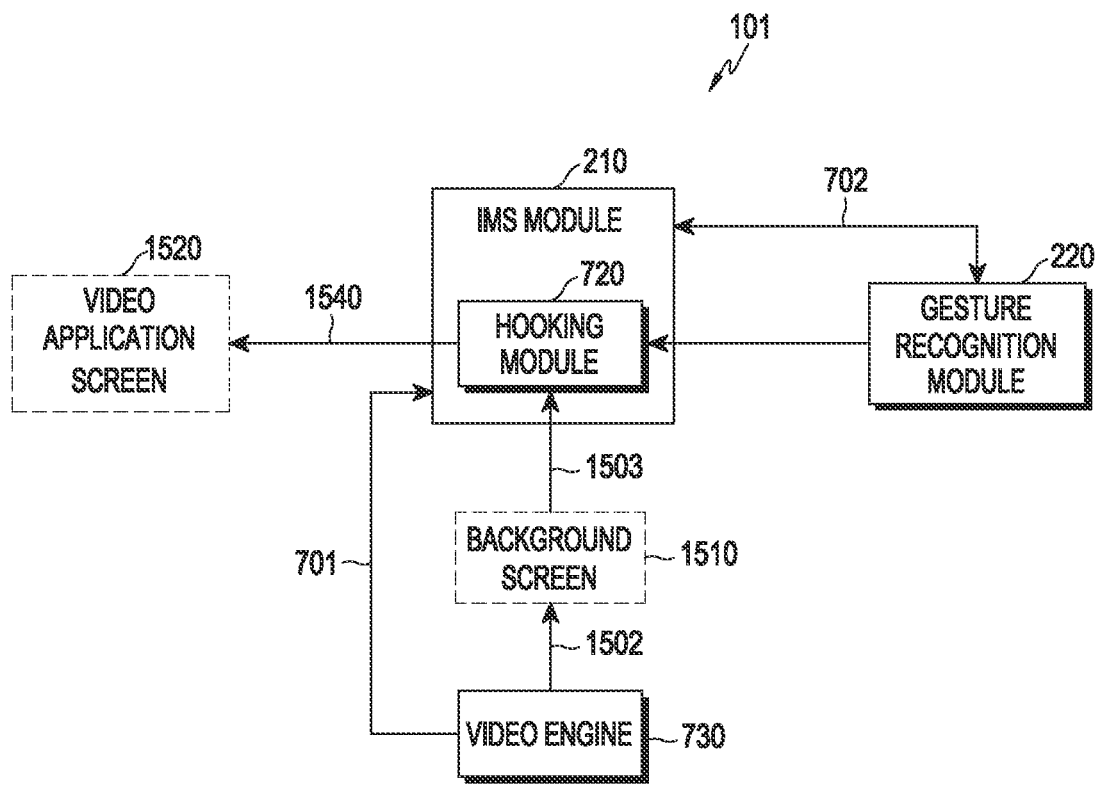
FIG. 15 is a view illustrating image hooking according to an embodiment of the disclosure.

FIG. 15 is a view illustrating image hooking according to an embodiment of the disclosure.

Referring to FIG. 15, the video engine 730 may draw 1502 the image received based on the communication module 190 on the background screen 1510 while the binding 701 with the IMS module 210 is maintained. In an embodiment of the disclosure, the background screen 1510 may be a screen generated by the hooking module 720. The hooking module 720 may identify 1503 that images are drawn on the background screen 1510 based on address information associated with the background screen 1510. The hooking module 720 may draw the received image on the video application screen 1520 based on the first screen information. The video application screen 1520 may be a screen displayed through a display module (e.g., the display module 160 of FIG. 1). The hooking module 720 may draw 1540 the image, received based on the communication module 190, on the video application screen 1520 based on the first screen information received from the video application. In an embodiment of the disclosure, while the hooking module 720 operates, the IMS module 210 and the gesture recognition module 220 may exchange 702 data based on maintaining the binding.

According to an embodiment of the disclosure, the electronic device 101 may comprise memory 130 storing instructions, the camera module 180, the communication module 190, the display module 160, and the at least one processor 120 operatively connected to the memory 130, the camera module 180, and the communication module 190. The instructions, that when executed by the at least one processor 120, may cause the electronic device 101 to identify a reception event of a video call based on the communication module 190. The instructions, that when executed by the at least one processor 120, may cause the electronic device 101 to hook one or more images captured based on the camera module 180 to provide image information corresponding to the hooked one or more images to a first application. The instructions, that when executed by the at least one processor 120, may cause the electronic device 101 to identify a gesture based on information output from the first application, by inputting the image information to the first application. The instructions, that when executed by the at least one processor 120, may cause the electronic device 101 to perform at least one operation corresponding to the identified gesture.

According to an embodiment of the disclosure, the instructions, that when executed by the at least one processor 120, may cause the electronic device 101 to, as at least part of providing the image information about the one or more images to the first application, generate a background screen based on obtaining first screen information associated with a video call from a video application. The instructions, that when executed by the at least one processor 120, may cause the electronic device 101 to, as at least part of providing the image information about the one or more images to the first application, provide second screen information associated with an image drawn on the background screen to a video engine. The instructions, that when executed by the at least one processor 120, may cause the electronic device 101 to, as at least part of providing the image information about the one or more images to the first application, obtain the image information about the one or more images based on identifying that one or more images captured based on the camera module 180 is drawn on the background screen by the video engine. The instructions, that when executed by the at least one processor 120, may cause the electronic device 101 to, as at least part of providing the image information about the one or more images to the first application, provide the obtained image information to the first application.

According to an embodiment of the disclosure, the instructions, that when executed by the at least one processor 120, may cause the electronic device 101 to, as at least part of performing the at least one operation corresponding to the identified gesture, perform an operation of accepting a received call based on identifying that the gesture is a gesture for accepting the received call. The instructions, that when executed by the at least one processor 120, may cause the electronic device 101 to, as at least part of performing the at least one operation corresponding to the identified gesture, perform an operation of rejecting the received call based on identifying that the gesture is a gesture for rejecting the received call.

According to an embodiment of the disclosure, the instructions, that when executed by the at least one processor 120, may cause the electronic device 101 to, as at least part of accepting the received call, identify that an image received based on the communication module 190 is drawn on the background screen by the video engine. The instructions, that when executed by the at least one processor 120, may cause the electronic device 101 to, as at least part of accepting the received call, draw the received image on a screen of the video application based on the first screen information.

According to an embodiment of the disclosure, the instructions, that when executed by the at least one processor 120, may cause the electronic device 101 to, as at least part of identifying the gesture based on information output from the first application, by inputting the image information to the first application, identify a shape corresponding to an object included in each of at least some images among the one or more images output from an artificial intelligence model for object shape estimation, trained to output data indicating a shape of an object by receiving coordinate data corresponding to an object included in an image as an input to output data indicating the shape of the object, by inputting coordinate data corresponding to an object included in the at least some images to the artificial intelligence model.

According to an embodiment of the disclosure, the instructions, that when executed by the at least one processor 120, may cause the electronic device 101 to, as at least part of identifying the gesture based on information output from the first application, by inputting the image information to the first application, sequentially convert image information about the one or more images into coordinate data corresponding to an object included in each of at least some images among the one or more images. The instructions, that when executed by the at least one processor 120, may cause the electronic device 101 to, as at least part of identifying the gesture based on information output from the first application, by inputting the image information to the first application, map the object included in each of the at least some images to a location of the display module 160 based on the sequentially converted coordinate data. The instructions, that when executed by the at least one processor 120, may cause the electronic device 101 to, as at least part of identifying the gesture based on information output from the first application, by inputting the image information to the first application, identify a movement of the object based on identifying a change in the mapped location and a shape of an object output from the artificial intelligence model. The instructions, that when executed by the at least one processor 120, may cause the electronic device 101 to, as at least part of identifying the gesture based on information output from the first application, by inputting the image information to the first application, identify the gesture based on the identified movement of the object.

According to an embodiment of the disclosure, the instructions, that when executed by the at least one processor 120, may cause the electronic device 101 to, as at least part of identifying the shape corresponding to the object included in each of the at least some images output from the artificial intelligence model, store the sequentially converted coordinate data in a data buffer. The instructions, that when executed by the at least one processor 120, may cause the electronic device 101 to, as at least part of identifying the shape corresponding to the object included in each of the at least some images output from the artificial intelligence model, input the coordinate data stored in the data buffer to the artificial intelligence model based on identifying that no object is detected from the one or more images during a wait time of the data buffer.

According to an embodiment of the disclosure, the instructions, that when executed by the at least one processor 120, may cause the electronic device 101 to, as at least part of identifying the gesture based on information output from the first application, by inputting the image information to the first application, identify a number of effective movements respectively corresponding to at least one shape for the object. The instructions, that when executed by the at least one processor 120, may cause the electronic device 101 to, as at least part of identifying the gesture based on information output from the first application, by inputting the image information to the first application, identify the gesture based on a shape having a largest number of effective movements obtained.

According to an embodiment of the disclosure, the instructions, that when executed by the at least one processor 120, may cause the electronic device 101 to, as at least part of identifying the number of the effective movements, identify the effective movement based on identifying that a change in the mapped location is a preset reference value or more.

According to an embodiment of the disclosure, the instructions, that when executed by the at least one processor 120, may cause the electronic device 101 to, as at least part of identifying the number of the effective movements, set a number of mapped locations corresponding to at least one shape for the object and the reference value to be proportional to each other.

According to an embodiment of the disclosure, a method for operating an electronic device 101 may comprise identifying a reception event of a video call based on a communication module 190 of the electronic device 101. The method for operating the electronic device 101 may comprise hooking one or more images captured based on a camera module 180 of the electronic device 101 to provide image information corresponding to the hooked one or more images to a first application. The method for operating the electronic device 101 may comprise identifying a gesture based on information output from the first application, by inputting the image information to the first application. The method for operating the electronic device 101 may comprise performing at least one operation corresponding to the identified gesture.

According to an embodiment of the disclosure, in a storage medium storing at least one computer-readable instruction, the at least one instruction may, when executed by at least one processor 120 of an electronic device 101, enable the electronic device 101 to perform at least one operation. The at least one operation may include identifying a reception event of a video call based on a communication module 190 of the electronic device 101. The at least one operation may include hooking one or more images captured based on a camera module 180 of the electronic device 101 to provide image information corresponding to the hooked one or more images to a first application. The at least one operation may include identifying a gesture based on information output from the first application, by inputting the image information to the first application. The at least one operation may include performing at least one operation corresponding to the identified gesture.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities. Some of the plurality of entities may be separately disposed in different components. According to an embodiment of the disclosure, one or more of the above-described components may be omitted, or one or more other components may be added. Alternatively or Further, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   memory storing instructions;
   a camera module;
   a communication module;
   a display module; and
   at least one processor operatively connected to the memory, the camera module, the communication module, and the display module,
   wherein the instructions, when executed by the at least one processor individually or collectively, cause the electronic device to:
      identify a reception event of a video call based on the communication module,
      hook one or more images captured based on the camera module to provide image information corresponding to the hooked one or more images to a first application, by:
         generating a background screen based on obtaining first screen information associated with the video call from a video application,
         providing second screen information associated with an image drawn on the background screen to a video engine,
         obtaining the image information about the one or more images based on identifying that the one or more images is drawn on the background screen by the video engine, and
         providing the image information to the first application,
      identify a gesture based on information output from the first application, based on the image information provided to the first application, and
      perform at least one operation corresponding to the identified gesture,
   wherein a screen of the video application is displayed on the display module when an image is drawn on the screen of the video application, and
   wherein the background screen is not displayed on the display module when the one or more images are drawn on the background screen.

2. The electronic device of claim 1, wherein the instructions, when executed by the at least one processor individually or collectively, further cause the electronic device to, as at least part of performing the at least one operation corresponding to the identified gesture:

perform an operation of accepting a received call based on identifying that the gesture is a gesture for accepting the received call, and perform an operation of rejecting the received call based on identifying that the gesture is a gesture for rejecting the received call.

3. The electronic device of claim 2, wherein the instructions, when executed by the at least one processor individually or collectively, further cause the electronic device to, as at least part of accepting the received call:

identify that an image received based on the communication module is drawn on the background screen by the video engine, and draw the received image on a screen of the video application based on the first screen information.

4. The electronic device of claim 1, wherein the instructions, when executed by the at least one processor individually or collectively, further cause the electronic device to, as at least part of identifying the gesture based on information output from the first application, based on the image information provided to the first application, identify a shape corresponding to an object included in each of at least some images among the one or more images output from an artificial intelligence model for object shape estimation, trained to output data indicating a shape of an object by receiving coordinate data corresponding to an object included in an image as an input to output data indicating the shape of the object, by inputting coordinate data corresponding to an object included in the at least some images to the artificial intelligence model.

5. The electronic device of claim 4, wherein the instructions, when executed by the at least one processor individually or collectively, further cause the electronic device to, as at least part of identifying the gesture based on information output from the first application, based on the image information provided to the first application:

sequentially convert the image information about the one or more images into coordinate data corresponding to an object included in each of at least some images among the one or more images, map the object included in each of the at least some images to a location of the display module based on the sequentially converted coordinate data, identify a movement of the object based on identifying a change in the mapped location and a shape of an object output from the artificial intelligence model, and identify the gesture based on the identified movement of the object.

6. The electronic device of claim 5, wherein the instructions, when executed by the at least one processor individually or collectively, further cause the electronic device to, as at least part of identifying the shape corresponding to the object included in each of the at least some images output from the artificial intelligence model:

store the sequentially converted coordinate data in a data buffer, and input the coordinate data stored in the data buffer to the artificial intelligence model based on identifying that no object is detected from the one or more images during a wait time of the data buffer.

7. The electronic device of claim 6, wherein the instructions, when executed by the at least one processor individually or collectively, further cause the electronic device to, as at least part of identifying the gesture based on information output from the first application, based on the image information provided to the first application:

identify a number of effective movements respectively corresponding to at least one shape for the object, and identify the gesture based on a shape having a largest number of effective movements obtained.

8. The electronic device of claim 7, wherein the instructions, when executed by the at least one processor individually or collectively, further cause the electronic device to, as at least part of identifying the number of the effective movements, identify the effective movement based on identifying that a change in the mapped location is a preset reference value or more.

9. The electronic device of claim 8, wherein the instructions, when executed by the at least one processor individually or collectively, further cause the electronic device to, as at least part of identifying the number of the effective movements, set a number of mapped locations corresponding to at least one shape for the object and the preset reference value to be proportional to each other.

10. A method performed by an electronic device, the method comprising:

identifying a reception event of a video call based on a communication module of the electronic device;

hooking one or more images captured based on a camera module of the electronic device to provide image information corresponding to the hooked one or more images to a first application by:

generating a background screen based on obtaining first screen information associated with the video call from a video application, providing second screen information associated with an image drawn on the background screen to a video engine, obtaining the image information about the one or more images based on identifying that the one or more images is drawn on the background screen by the video engine, and providing the image information to the first application;

identifying a gesture based on information output from the first application, based on the image information provided to the first application; and performing at least one operation corresponding to the identified gesture, wherein a screen of the video application is displayed on a display module of the electronic device when an image is drawn on the screen of the video application, and wherein the background screen is not displayed on the display module when the one or more images are drawn on the background screen.

11. The method of claim 10, wherein the performing of the at least one operation corresponding to the identified gesture includes:

performing an operation of accepting a received call based on identifying that the gesture is a gesture for accepting the received call; and performing an operation of rejecting the received call based on identifying that the gesture is a gesture for rejecting the received call.

12. The method of claim 11, wherein the performing of the operation of accepting the received call includes:

identifying that an image received based on the communication module is drawn on the background screen by the video engine; and drawing the received image on a screen of the video application based on the first screen information.

13. The method of claim 10, wherein the identifying of the gesture based on information output from the first application, based on the image information provided to the first application includes:
  identifying a shape corresponding to an object included in each of at least some images among the one or more images output from an artificial intelligence model for object shape estimation, trained to output data indicating a shape of an object by receiving coordinate data corresponding to an object included in an image as an input to output data indicating the shape of the object, by inputting coordinate data corresponding to an object included in the at least some images to the artificial intelligence model.

14. The method of claim 13, wherein the identifying of the gesture based on information output from the first application, based on inputting the image information provided to the first application includes:
  sequentially converting the image information about the one or more images into coordinate data corresponding to an object included in each of at least some images among the one or more images;
  mapping the object included in each of the at least some images to a location of a display module of the electronic device based on the sequentially converted coordinate data;
  identifying a movement of the object based on identifying a change in the mapped location and a shape of an object output from the artificial intelligence model; and
  identifying the gesture based on the identified movement of the object.

15. The method of claim 14, wherein the identifying of the shape corresponding to the object included in each of the at least some images output from the artificial intelligence model includes:
  storing the sequentially converted coordinate data in a data buffer; and
  inputting the coordinate data stored in the data buffer to the artificial intelligence model based on identifying that no object is detected from the one or more images during a wait time of the data buffer.

16. The method of claim 15, wherein the identifying of the gesture based on information output from the first application, based on the image information provided to the first application includes:
  identifying a number of effective movements respectively corresponding to at least one shape for the object; and
  identifying the gesture based on a shape having a largest number of effective movements obtained.

17. One or more non-transitory computer-readable storage media storing computer-executable instructions that, when executed by at least one processor of an electronic device individually or collectively, cause the electronic device to perform operations, the operations comprising:
  identifying a reception event of a video call based on a communication module of the electronic device;
  hooking one or more images captured based on a camera module of the electronic device to provide image information corresponding to the hooked one or more images to a first application by:
    generating a background screen based on obtaining first screen information associated with the video call from a video application,
    providing second screen information associated with an image drawn on the background screen to a video engine,
    obtaining the image information about the one or more images based on identifying that the one or more images is drawn on the background screen by the video engine, and
    providing the image information to the first application;
  identifying a gesture based on information output from the first application, based on the image information provided to the first application; and
  performing at least one operation corresponding to the identified gesture,
  wherein a screen of the video application is displayed on a display module of the electronic device when an image is drawn on the screen of the video application, and
  wherein the background screen is not displayed on the display module when the one or more images are drawn on the background screen.

18. The one or more non-transitory computer-readable storage media of claim 17,
  wherein the first screen information includes location information in which the image is drawn on the screen of the video application, and
  wherein the second screen information includes location information in which the image is drawn on the background screen.

19. The electronic device of claim 1,
  wherein the first screen information includes location information in which the image is drawn on the screen of the video application, and
  wherein the second screen information includes location information in which the image is drawn on the background screen.

20. The method of claim 10,
  wherein the first screen information includes location information in which the image is drawn on the screen of the video application, and
  wherein the second screen information includes location information in which the image is drawn on the background screen.

* * * * *